United States Patent

Love

[15] 3,657,619
[45] Apr. 18, 1972

[54] STARTING CONTROLLER FOR ELECTRIC MOTOR

[72] Inventor: Winston A. Love, 118 Maple Street, Marietta, Ohio 45750

[22] Filed: July 22, 1970

[21] Appl. No.: 57,286

[52] U.S. Cl. .......................318/221 R, 318/227, 318/221 E
[51] Int. Cl. .........................................................H02p 1/44
[58] Field of Search...........................318/221 R, 221 E, 227

[56] References Cited

UNITED STATES PATENTS 3,376,484    4/1968    Lewus..................................318/221 R
3,447,057    5/1969    Brown et al..........................318/227 UX

*Primary Examiner*—Gene Z. Rubinson
*Attorney*—Mahoney & Miller

[57] ABSTRACT

A starting controller is provided for electric motors of the split-phase type. This controller incorporates an electrical switching circuit utilizing a bi-directional, solid-state switching device as the element which effects the switch function. The circuit elements and components are incorporated in a mechanical structure having an electrical current transformer provided with a core that also forms a heat sink for the solid-state switching device. The core thus mechanically supports both the switching device and the transformer windings, performing a heat dissipation function as well as forming a part of the magnetic circuit for the transformer controlling operation of the solid-state switching device. All components including the transformer core, are embedded in a dielectric potting compound within an outer iron core shell forming the remainder of the magnetic circuit for the transformer.

10 Claims, 7 Drawing Figures

PATENTED APR 18 1972
3,657,619
SHEET 1 OF 3
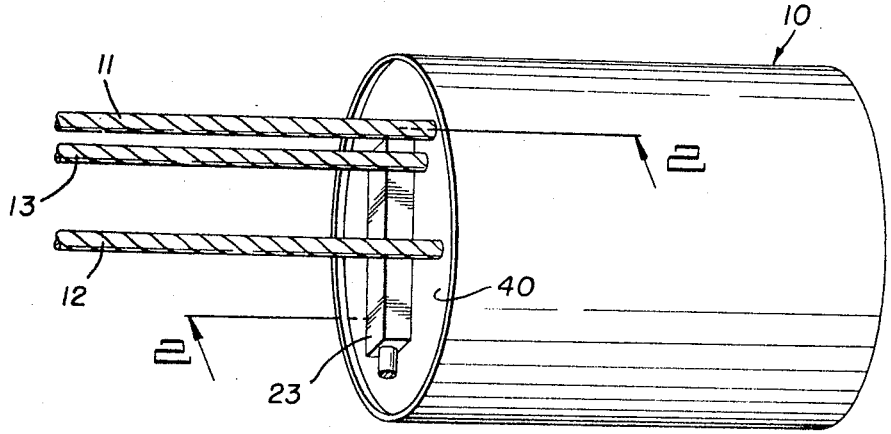
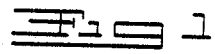
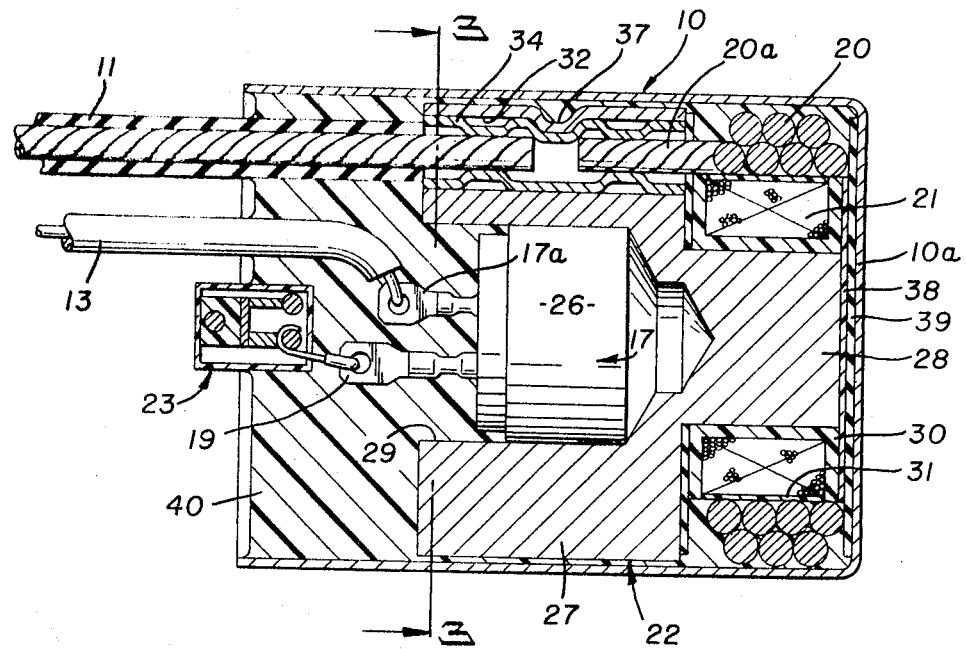
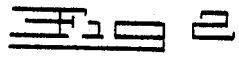
INVENTOR.
WINSTON A. LOVE
BY
MAHONEY, MILLER & STEBENS
BY Robert E. Stebens
ATTORNEYS

INVENTOR.
WINSTON A. LOVE

BY
MAHONEY, MILLER & STEBENS
BY Robert E. Stebens
ATTORNEYS

STARTING CONTROLLER FOR ELECTRIC MOTOR

GENERAL DESCRIPTION OF INVENTION

Single-phase electrical motors operating on alternating current are generally provided with two windings, one of which is termed a running winding and the other a starting winding. In addition, a switching mechanism must be provided for selectively connecting the starting winding in circuit during that period of time required to effect starting of the motor and to then disconnect this winding for subsequent normal running operations. The switching mechanism disclosed in the prior art apparatus often comprised a centrifugal switch responsive to the rotational speed of the motor armature. In newer control devices, circuits utilizing solid-state switching devices have been developed to effect the switching function relative to the starting winding in response to electrical current demands in the running winding. This invention is directed to a mechanical structure incorporating an electrical control circuit utilizing a bi-directional, solid-state switching device. The mechanical structure, disclosed herein and shown in the accompanying drawings, combines electrical and magnetic circuit functions with heat dissipation capability to provide a novel starting controller which is of a relatively compact configuration, although extremely efficient and readily attachable or connectable with standard single-phase electric motors. This is accomplished by combining the function of the heat sink and the transformer core with the mechanical support for a solid-state switching device and thus effect heat dissipation which is required to maintain the switch device in operating condition.

These and other objects and advantages of a starting controller embodying this invention will be readily apparent from the following detailed description of embodiments thereof and the accompanying drawings:

In the drawings:

FIG. 1 is a perspective view of a motor starter unit embodying this invention.

FIG. 2 is a medial longitudinal sectional view taken on a plane passing through line 2—2 of FIG. 1.

DETAILED DESCRIPTION OF THE INVENTION

A starting controller embodying this invention is shown in the perspective view of FIG. 1, and is seen to comprise an outer external housing 10 of elongated cylindrical form having three electrical conductors 11, 12 and 13 axially projecting from one end thereof and adapted for interconnection of the controller with a motor. The housing 10 is structurally self-supporting and is adapted to be secured to a motor frame by suitable clamp means (not shown) and the conductors 11, 12 and 13 are electrically connected to the windings and power leads to the motor.

Figure 5:
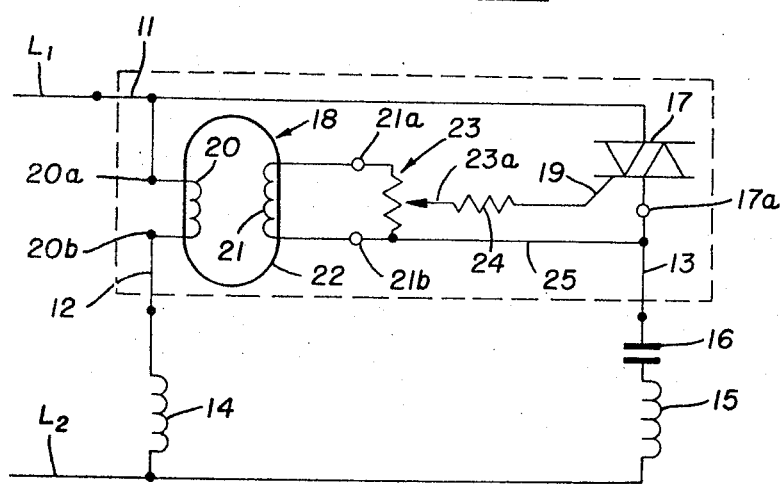
FIG. 5 is a schematic diagram of the electrical circuit for the motor starter unit.

For better understanding of the structural requirements for a starting controller, reference may be had to FIG. 5, which schematically illustrates an electrical circuit of a single phase motor provided with the circuit incorporated in the mechanical structure of this invention. This single phase motor schematically illustrated in FIG. 5, is of the split-phase type and includes a running-winding 14 and a starting-winding 15 which are connectable to power conductors L1 and L2 for connecting the motor to a suitable electrical power source. Also connected in series with the starting-winding 15 is a capacitor 16 for establishing a phase difference between the windings in order to effect the starting of the motor. The control circuit components which are incorporated in the starting controller, shown in the remaining figures of the drawing, are enclosed within the broken lines of FIG. 5 showing the connection of these components with either the line conductors L1, L2 or the starting and running windings 15 and 14. This circuit incorporates a solid-state switching device 17 connected in series with the starting winding 15 and is also connected with a current transformer 18. The solid state switch 17 is bidirectional and is provided with a gating terminal as it is of a type that is gated to an ON or conducting state during application of each half-cycle of a sinusoidal waveform voltage applied across the terminal and returned to an OFF state at the end of each half-cycle when the voltage goes to zero. This gating terminal identified by the numeral 19 is connected through the current transformer 18 to respond to current flow through the running-winding 14 and thereby effect control over the switch 17 and conduction through the starting-winding 15. Included in the current transformer 18 is a primary winding 20 and a secondary winding 21 which are wound on a core 22 fabricated from a material having low-magnetic reluctance. The primary winding 20 is connected by its respective terminals 20a and 20b to the conductors 11 and 12 and is therefore connected in series with the running-winding 14 of the motor. The secondary winding 21 is connected at its terminals 21a and 21b across a potentiometer 23 which includes a movable contact 23a connected to the gating terminal 19 of the switch device. A current limiting resistor 24 may be interposed in the line connected with the gating terminal 19 as determined by the characteristics of the specific solid-state switch device 17 utilized in a particular circuit. One terminal 21b of the secondary winding is also connected by the conductor 25 to one current or output terminal 17a of the switch device and thus completes the circuit for providing a gating voltage across the gating terminals of the switch device while the opposite terminal is connected to conductor 11.

The electrical operation of this control circuit is briefly summarized for understanding of the functioning of the mechanical structure. Assuming that the motor is stopped and it is desired to effect a starting operation, the conductors L1 and L2 would be first connected to the power source. In this configuration, the current would initially flow through conductors 11 and 12 to the running winding 14 as well as the primary winding 20 of the current transformer 18. The switch 17 remains in a non-conducting state until a gating voltage is applied to the terminal 19 and thus switching the device to an ON state energizing the starting winding 15. Since a relatively high current is caused to flow through the running winding 14 during the initial stages of the starting operation, this current would appear as a control voltage at the secondary winding 21 and a proportionate amount of this voltage is taken off at the potentiometer contact 23a and applied as a gating voltage to the terminal 19 of the switch. Because of the relatively high initial current requirements, this voltage will be of a magnitude sufficient to switch the device 17 to an ON state and current will then flow through the phase-shifting capacitor 16 and starting winding 15. As the speed of the motor increases, the current flow through running winding 14 will be reduced with this reduced current flow reflected as a decrease in the voltage across the potentiometer 23 and a corresponding decrease in voltage applied to the gating terminal 19. At a predetermined point which is selected by appropriate positioning of the potentiometer contact 23a, the voltage applied to the gating terminal 19 will have dropped to a point which will be insufficient to gate the switch device 17 to an ON state. At this point, the starting-winding 15 will be effectively disconnected from the power source and the motor will continue to operate by current flow only through the running-winding 14. Utilizing a bi-directional switching device 17 provides control as to current flow in the starting winding 15 in both half-cycles of the power applied to the motor which is usually 60Hz.

Having reference to FIG. 2, it will be seen that the solid state switching device 17 is of a construction that comprises an outer case 26 fabricated from an electrically conductive material which forms one of the electrical terminals of the device and is of a generally cylindrical shape having axially spaced end portions. Axially projecting from one of the ends in electrically insulated relationship to the outer case 26 is the main electrical current terminal 17a and the gating terminal 19. The outer case 26 of the switch device 17 is also adapted to be mechanically connected with a heat sink for dissipation of heat generated by current flow through the solid state material.

In accordance with this invention, the transformer core 22 is also constructed and designed to function as the heat sink for the switching device 17 as well as forming a part of the low-reluctance magnetic circuit which includes the outer external housing 10.

The transformer core 22 comprises a cylindrical main body portion 27 having a relatively reduced diameter projection 28 extending from one end and a coaxial cylindrical cavity 29 formed in the main body portion 27 and which is open at the opposite end of the main body portion. The cavity 29 is of a diameter to receive the switching device 17 which is secured in the cavity through an interference fit. The depth of the cavity 29 is sufficient to permit the terminals 17a and 19 to be at least partially within the cavity but leaving the end most parts exposed to facilitate interconnection with conductors or components.

Positioned on the axial projection 28 are the primary and secondary windings 20 and 21 of the transformer. The secondary winding 21 comprising a relatively large number of turns of small gauge wire may be advantageously preformed on a spool or bobbin 30 fabricated from a suitable dielectric material. An insulating band of dielectric material 31 may be positioned around the circumference of the secondary winding 21 and the primary winding 20 comprising a relatively small number of turns of larger diameter wire then wound around the secondary winding, as is best seen in FIG. 2. The assembled primary and secondary windings are positioned on the axial projection 28 of the transformer core with the terminal 20a of the primary winding 21 projecting into an axially extending passage 32 formed in the main body portion 27 of the core while the other terminal 20b extends into an open ended channel 33 which also extends axially of the main body portion 27. The terminals 21a and 21b of the secondary winding project axially through the channel 33 and out at the opposite end. The electrical conductor 11, which comprises a conductor having an outer insulating sheath, is secured to the terminal 20a of the primary winding by a crimp-type connector 34 with this connector being disposed in the passage 32 when the windings 20 and 21 are assembled as shown in FIG. 2. Terminal 20b of the primary winding is also secured by means of a crimp type connector 35 to the conductor 12, but a tubular insulating sleeve 36 is formed over this connector and adjacent portions of the primary winding terminal 20b and conductor 12 to prevent electrical contact with the main body portion 27 of the transformer core. The connector 34 is in mechanical and electrical contact with the core and is preferably secured, when assembled therewith, by a crimp indentation 37 as can be best seen in FIGS. 2 and 4.

Figure 3:
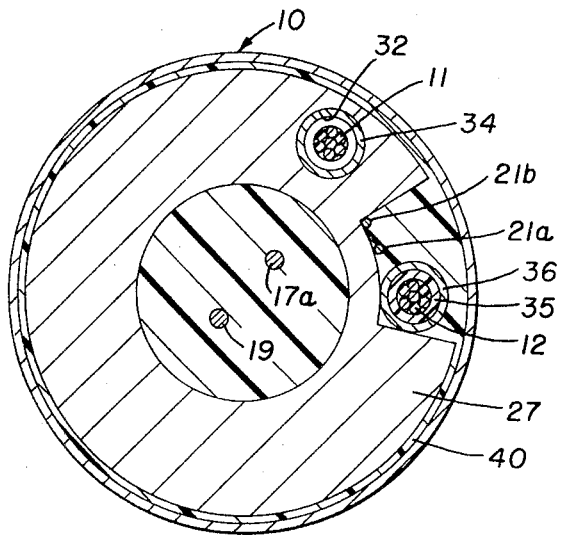
FIG. 3 is a transverse sectional view taken along line 3—3 of FIG. 2.
Figure 4:
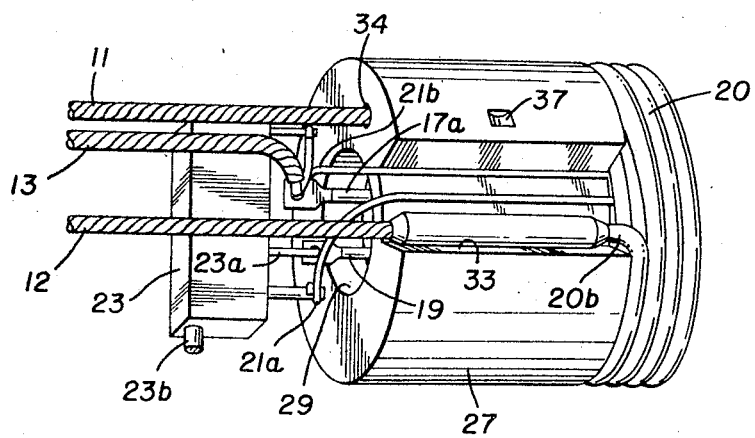
FIG. 4 is a perspective view of the heat sink and transformer core with transformer coils, rectifier and potentiometer assembled therewith.

After assembly of the transformer windings with the transformer core 22 and positioning of the switching device 17 in the cavity 29, the potentiometer 23 may then be electrically and mechanically connected to the respective terminals in accordance with the schematic diagram of FIG. 5, and as best seen in FIG. 4. The particular potentiometer 23 utilized in the illustrated embodiment includes a structural outer housing having three terminals for mechanical connection to the components or other conductors of the circuit and an adjustment device 23b permitting external setting of the movable contact 23a as is required for a particular switch device.

The assembled core 22 and transformer windings 20, 21, potentiometer 23 and associated solid-state switching device 17, are then positioned within the cylindrical housing 10 which, in this embodiment, is formed with the end wall 10a. The inside diameter of the housing 10 is larger than that of the outer diameter thus leaving a space between the housing and core structure. A pair of circular sheets of dielectric material 38 and 39 are disposed between the terminal end of the axial projection 28 and the end wall 10a thereby assuring electrical insulation of the end wall 10a of the housing from the core 22. With the housing 10 and core 22 thus assembled, the remaining space and voids within the housing are filled with an insulating compound such as an epoxy potting material 40, which, when solidified, secures the assembled components in proper position and maintains a dielectric spacing between the housing 10 and main body portion 27 of the core 22. This electrically isolates the housing 10 but completes the magnetic circuit for the transformer core with the two dielectric gaps now formed by the epoxy material 40 and the sheets of dielectric material 38 and 39. It will also be noted that the length of the housing 10 is such that with the potentiometer 23 positioned as shown connected to the terminals of the switching device 17, the potentiometer will also be secured and held in position by the epoxy compound 40.

Figure 6:
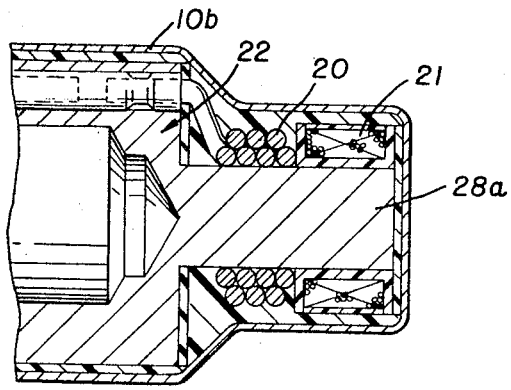
FIG. 6 is a fragmentary medial longitudinal sectional view of a modified structure for a motor starter unit similar to that of FIG. 2, but having the primary and secondary windings disposed in axially aligned relationship.

A modified construction is shown in FIG. 6 wherein the transformer core 22 is formed with an axial projection 28a of relatively greater length to permit the primary and secondary windings 20 and 21 to be positioned thereon in axially spaced relationship. The construction is otherwise the same as that previously described and will not be repeated other than to note that the relative positions of the primary and secondary windings may be interposed and that the housing 10b is of relatively reduced diameter in the region of the windings.

Figure 7:
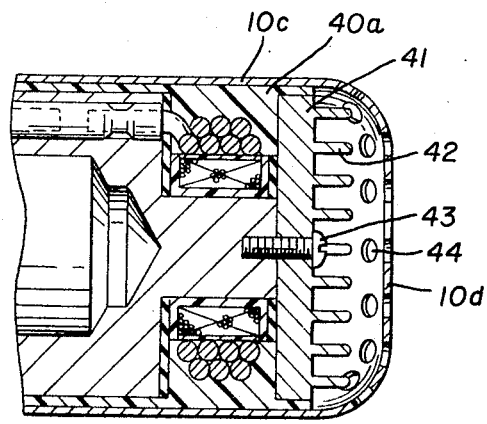
FIG. 7 is a fragmentary medial longitudinal sectional view of a further modified structure for a motor starter unit similar to that of FIG. 2, but having the heat sink and outer case modified to enhance heat dissipation.

A further modification of a motor starter is shown in FIG. 7. This modified structure is substantially the same as that shown and described in connection with FIGS. 1 through 4, but which incorporates a heat radiator 41. The heat radiator 41, also preferably formed from a low magnetic reluctance material is a circular plate having several integrally formed, transversely extending ribs or fins 42. The plate is of a diameter to fit within the tubular housing 10c but electrically insulated therefrom by the epoxy compound 40a with the plate being rigidly secured to the axial projection 28a by a bolt 43. Numerous apertures 44 are formed in the domed end wall 10d of the housing permitting better air circulation while providing protection against inadvertant contact with the fins or plate which are not otherwise electrically insulated. The magnetic circuit now includes the dielectric-filled radial gap between the heat radiator 41 and the housing 10c.

It will be readily apparent from the foregoing detailed description of the several embodiments of this invention that an improved starting-controller structure incorporating a solid-state switching device is provided for single phase electric motors. The novel construction results in a relatively small size unit which is easily mounted on conventional motor structures and which is a completely sealed unit without mechanical switch contacts or other moving parts for enhanced reliability.

Having thus described this invention, what is claimed is:

1. An electric-motor starting controller comprising
    A. a solid-state electrical switching device having an outer case forming a thermally conductive, electrical terminal,
    B. an electrical-current transformer including
        1. a core formed from a low-reluctance magnetic material with a relatively high thermal conductivity and having a cavity formed therein to receive said switching device with the outer case in electrical and thermally conductive relationship to said core and form a heat sink therefor,
        2. a primary winding formed on said core in magnetically coupled relationship therewith and having one terminal end electrically connected to said core, and 3. a secondary winding formed on said core in magnetically coupled relationship to said primary winding and said core, and C. a structural housing of low reluctance magnetic material circumferentially enclosing the core and windings of said current transformer and completing a magnetic circuit around said windings in cooperation with said core, said housing being electrically insulated from said core.

2. An electric-motor starting controller according to claim 1 wherein said core includes an elongated main body portion with the cavity opening at one axial end and having an axial projection extending from the opposite end with said primary and secondary windings formed on said projection, said housing being of elongated tubular form to coaxially receive said core and project over said windings into magnetic circuit relationship with said axial projection.

3. An electric-motor starting controller according to claim 2 wherein said housing is formed with an end wall which is disposed adjacent to but electrically insulated from the end wall of said axial projection.

4. An electric-motor starting controller according to claim 2 wherein said core includes an end plate secured thereto at the end of said axial projection and said housing extends into magnetic circuit relationship with the circumferential edge of said plate but electrically insulated therefrom, said plate having a plurality of ribbed projections formed on the end surface thereof for enhanced heat dissipation.

5. An electric-motor starting controller according to claim 4 wherein said housing includes a domed end wall portion projecting over and enclosing said end plate with a plurality of apertures formed therein.

6. An electric-motor starting controller according to claim 1 having a dielectric material interposed between said structural housing and said core.

7. An electric-motor starting controller according to claim 6 wherein said dielectrical material structurally secures together said housing and core.

8. An electric-motor starting controller according to claim 2 wherein said primary and secondary windings are disposed one inside the other in axial alignment with the outermost circumference not projecting beyond the outer circumferential surface of said core.

9. An electric-motor starting controller according to claim 8 wherein said core is formed with an axially extending through passage into which the one terminal end of said primary winding is mechanically secured and includes an electrical conductor mechanically secured in said passage and projecting from the opposite side, and extending a distance outwardly from said housing, a through channel through which the other terminal end portion of said primary winding and both terminal end portions of said secondary winding project and extend a distance beyond said one axial end of said core.

10. An electric-motor starting controller according to claim 9 wherein said switching device includes a second terminal and a gating terminal and an electrical conductor secured thereto and extending a distance outwardly from said housing, a potential divider having one end terminal connected to said second terminal along with one terminal end of said secondary winding, a second end terminal connected with the other end terminal of said secondary winding and a center terminal connected with said gating terminal, said housing axially projecting a distance beyond said one axial end with a dielectric material filling all voids within said housing and structurally securing together said housing and core and structurally supporting terminal end connections and said potentiometer.

* * * * *